United States Patent [19]
Watford

[11] Patent Number: 5,666,005
[45] Date of Patent: Sep. 9, 1997

[54] ELECTROSTATIC WINDSHIELD WIPER AND HEADLIGHT CONTROL CIRCUIT

[76] Inventor: Stephen Lionel Watford, 12 Parnell Pl., Jersey City, N.J. 07305

[21] Appl. No.: 551,767

[22] Filed: Nov. 7, 1995

[51] Int. Cl.$^6$ ............................................. B60Q 1/04
[52] U.S. Cl. ............................................. 307/10.8; 315/83
[58] Field of Search .................... 307/9.1, 10.1, 307/10.8; 361/190, 170; 315/77, 82, 83

[56] References Cited

U.S. PATENT DOCUMENTS

| | | | |
|---|---|---|---|
| 3,767,966 | 10/1973 | Bell | 315/83 |
| 5,027,001 | 6/1991 | Torbert | 307/10.8 |
| 5,185,558 | 2/1993 | Benedict et al. | 315/82 |
| 5,202,581 | 4/1993 | Moore | 307/10.8 |
| 5,293,077 | 3/1994 | Seki et al. | 307/10.8 |
| 5,449,974 | 9/1995 | Dunbar | 315/82 |
| 5,517,065 | 5/1996 | Kover, Jr. | 307/10.8 |
| 5,523,630 | 6/1996 | Smelley et al. | 307/10.8 |

*Primary Examiner*—Richard T. Elms
*Attorney, Agent, or Firm*—McAulay Fisher Nissen Goldberg & Kiel, LLP

[57] ABSTRACT

An electrostatic windshield wiper and headlight control circuit, for coupling an automobile windshield wiper circuit with automobile lamps and remotely actuating the automobile lamps; comprising a metal oxide semiconductor field effect transistor (Q1) and a relay. The metal oxide semiconductor field effect transistor (Q1) has an insulated gate for maintaining physical electrical isolation between the windshield wiper and automobile lamp circuits, and for operating with voltage only; it produces and uses static electricity to actuate the actuator circuit of the relay. The relay is for remotely controlling power to the automobile lamps. Voltage from the windshield wiper circuit is used to produce an electrostatic field, which actuates the actuator circuit of the relay, in effect, the isolated switching element of the relay becomes activated, and automatically transfers power directly from the vehicle's battery to connecting lamps. The lamps remain "on" after the wiper circuit is turned "off" to ensure safety.

20 Claims, 4 Drawing Sheets

5,666,005

ELECTROSTATIC WINDSHIELD WIPER AND HEADLIGHT CONTROL CIRCUIT

FILED OF INVENTION

This invention relates to automotive vehicles, specifically to the windshield wiper circuitry and the lighting systems of automotive vehicles.

CROSS-REFERENCE TO RELATED APPLICATION

This application is related to application Ser. No. 07-823,033, Jan. 21, 1992, abandoned, which is a continuation-in-part of Ser. No. 07-639,294, Jan.16, 1991, abandoned.

DESCRIPTION OF PRIOR ART

Heretofore, windshield wiper circuits and lighting systems were installed in automotive vehicles as independent circuits with separate and independent controls. When bad weather occurs, during the daytime, driving visibility diminishes. Automobile lights help the driver, pedestrians, and other drivers see clearly.

Proper use of automobile lights is vital to safe driving. Only concerned and safety conscious drivers will switch on their automobile lights along with switching on their windshield wipers. This is an unrecognized problem. Also, turning various controls at the same time distracts driving and is inconvenient. Operating various controls while driving means switching your focus quickly between the road and dashboard and back again. Drivers switching their focus off the road, during bad weather, increases hazardous driving.

Windshield wiper circuitry has become increasingly complex; there are many variations, manufactured in an industry that perpetuates changing technology. Some with highly sensitive circuitry in their control module, where it is important to avoid drawing current from such circuits. A device with a connector that is immnensely adaptable to windshield wiper circuitry would be ideal for the many variations of wiper circuitry.

The prior art noted below does not describe or suggest using a connector which can be used in highly sensitive measuring applications and will not draw current when connected directly into the windshield wiper circuitry nor a connector which will provide physical insulation between the wiper connection and can still induce a switching action whenever the wiper circuit is switched "on".

A nonconductive insulated electrostatic connector will definitely function as a widely adaptable and reliable connector which avoids drawing current from the wiper circuit, and most importantly it will allow the operation of the wiper circuit to switch "on" connecting headlight circuits.

Moreover the prior art noted below takes considerable measures for keeping the windshield wiper and headlight circuits isolated, but does not prove to recognize, and fails to describe or suggest to take thorough measures for adaptability and nonconductivity when interconnecting between the actual windshield wiper circuitry.

Relevant Prior Art Cited:

U.S. Pat. No. 3,751,719 August 1973, Guarasci et al.; "A heavy current relay circuit"; uses a silicon control rectifier, a device with a pn junction which conducts current flow with very little resistance.

U.S. Pat. No. 3,767,966 October 1973, Bell; "Automatic headlight control system for automobiles"; uses a complex circuit network which is connected to the windshield wiper power switch terminal.

U.S. Pat. No. 4,317,073 February 1982, Blaszkowski; "Windshield wiper control system"; also, uses a complex circuit network which is connected directly into the windshield wiper circuitry.

U.S. Pat. No. 5,185,558 February 1993, Benedict et al.; "Vehicle light, windshield wiper control system"; uses an opto-isolator semiconductor to maintain isolation between the windshield wiper and automobile lamp circuits. However, the input of the opto-isolator, which is connected to the windshield wiper circuit, draws current from the windshield wiper circuit for operation.

U.S. Pat. No. 5,202,581 April 1993, Moore; "Windshield wiper and headlight control circuit"; uses a latching circuit, which consist diodes, resistors, and a triac, and is also connected directly to the wiper circuit.

All of the prior art cited have complex circuitry which may require a number of components to provide the function that is necessary to avoid drawing large amounts of current from the wiper circuitry. Also, the prior art noted above used semiconductors with pn junctions in the actual circuit which actually joins the wiper circuit to their invented circuitry.

Any component with a pn junction clearly indicates it will permit physical electrical contact, and will allow an electric current to pass through it. This is not good; it is a disadvantage and deficiency of the prior art; since even a small amount of current drawn from a highly sensitive wiper circuit could result in damage or malfunction to the wiper circuit operation. Also, this analysis confirms the fact that all of the prior art noted above had a deficiency in adaptability for making connections to the actual wiper circuit.

Wherefore, I have provided an Electrostatic windshield wiper and headlight control circuit (E-Static Control), which is an electrically isolated electrostatic controlled switching circuit, for use in automotive vehicles. The E-Static Control will function as a safety device to switch "on" the automobile lights whenever the windshield wipers are turned "on".

Objects and Advantages

Accordingly, several objects and advantages of the E-Static Control are:

(a) One object is to provide an electrostatic coupler and actuator for windshield wiper and automobile lamp circuits, which will draw absolutely no current from the windshield wiper circuit for operation, thereby providing a nonconductive insulated electrostatic connection.

(b) Another object is to provide an adaptable windshield wiper coupler that adapts to the many variant windshield wiper circuits but most importantly, an adaptable windshield wiper coupler that can be used in highly sensitive measuring applications where it is important to avoid loading down windshield wiper circuits, thereby providing an adaptable and reliable nonconductive insulated electrostatic connection.

(c) Still another object is to provide a windshield wiper coupler and actuator that has no pn junction and will not permit physical electrical contact or allow electric current to pass, but will have an insulated gate which will prevent the disadvantage and deficiency of a pn junction, thereby providing thorough measures for insulation, adaptability, and nonconductivity when connecting directly into windshield wiper circuitry.

(d) A further object is to provide a very simple, inexpensive windshield wiper and headlight control circuit which does not contain latching, multiple, or complex circuitry interconnected between the wiper and headlight connection, but will contain an electrostatic coupler and actuator for a remote controlled switch, where the electrostatic coupler and actuator is an enhancement mode metal oxide semiconductor field effect transistor (E-MOSFET), which is a single component, that connects into the wiper circuit and actuates the headlight circuitry without latching, multiple, or complex circuitry interconnected between the windshield wiper and the headlight circuits, thereby providing an E-MOSFET with a remote controlled switch to provide a very simple, inexpensive wiper and headlight control circuit.

(e) Still a further object is to provide an enhancement mode MOSFET which acts as a coupler for windshield wiper circuits, and an actuator for headlight circuits as well as an isolator between the wiper and headlight circuits, but will also act as an insulated connection, for the actual connection to the wiper circuit while operating as a switch for the headlight circuitry, whereby the insulated connection at the wiper circuit creates an electrostatic field where static electricity actuates the switch for the headlight circuitry, thereby providing a nonconductive insulated electrostatic connection.

The reader will notice, the object of the invention is to provide a highly reliable electrostatic coupler, which is a very simple, adaptable, and efficient device that can be used with many variant windshield wiper circuits.

Also, some additional objects and advantages are:

(f) to enhance visibility in bad weather during the daytime.

(g) to increase the proper use of automobile lights.

(h) to help cut down distractions and offer greater convenience by allowing independent isolated circuits to operate simultaneously from one operation.

(i) to help provide safer driving conditions by allowing the driver to focus more on the road, instead of looking away from the road, locating various controls.

Thus far, the reader should notice, using the E-Static Control is advantageous, when a driver turns "on" the windshield wipers to improve visibility, a great advantage of having the lights automatically switch "on" to increase safety and enhance visibility, is well-accomplished. This advantage helps minimize the chances of having accidents due to poor visibility and significantly increases visual awareness while driving in bad weather.

Further objects and advantages of the E-Static Control will become apparent from a consideration of the drawings and ensuing description of it.

DRAWING FIGURES

The E-Static Control component placement diagrams (FIG. 1 and 3) illustrate a suitable position for each component mounted on a universal printed circuit board. The schematic diagrams (FIG. 2 and 4) illustrate how the components are electronically interconnected.

Description with SCR Driver

Figure 1:
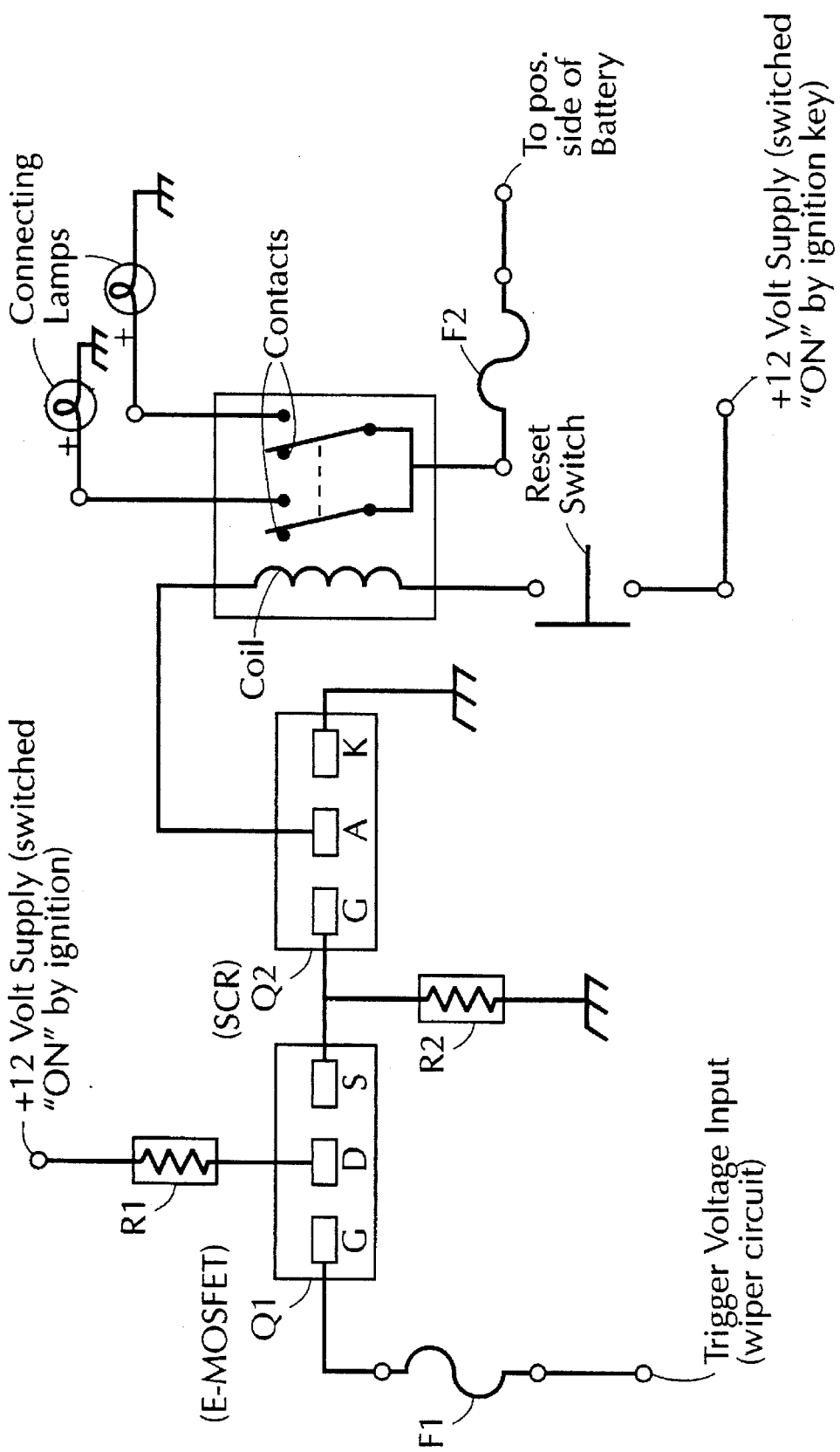
FIG. 1 is a component placement diagram with a Thyristor (SCR) used as a relay driver.

FIG. 1 shows the static physical structure, of the E-Static Control circuit, mounted on a universal printed circuit board (U-PCB), comprising a controllable electron valve Q1 and an automatic switch (relay) with a silicon-controlled rectifier Q2 (SCR) as a relay driver.

Fuse F1 is connected between the gate G of the electron valve Q1 and the low speed circuit, of the windshield wiper circuitry. Q1 is an insulated-gate field effect transistor (IGFET), more precisely, an enhancement-mode, metal -oxide-semiconductor field effect transistor (E-MOSFET). This electron Q1 valve joins the windshield wiper circuit with the E-Static Control Circuit. The gate G of Q1 has no physical electrical contact with its drain D and sources. The drain D of Q1 is connected to a positive 12 volt supply through a resistor R1. The sources of Q1 connects through a second resistor R2 to a common ground point on the U-PCB, and to the gate G of Q2 in the form of a thyristor. The anode A of the rectifier Q2 connects through a relay coil and through a reset switch, to the same positive 12 volt power supply that the drain D of the electron valve Q1 is connected to. A jumper wire (not shown) connects these two points (+12 volt input) together, then the connection is made to the positive 12 volt power supply. The cathode K of the rectifier Q2 is connected directly to a common ground point on the U-PCB. Again, a jumper wire (not shown) is used, to connect both ground points on the U-PCB together, before making the connection to e common ground of the 12 volt power supply. The relay R will join the E-Static Control circuit with the lamp circuit(s). There is no physical electrical connection between the relay's coil and its contacts. The movable contact is connected to the positive terminal of the battery through a fuse F2 and the stationary contact is connected directly to the positive side of the lamp(s).

Figure 2:
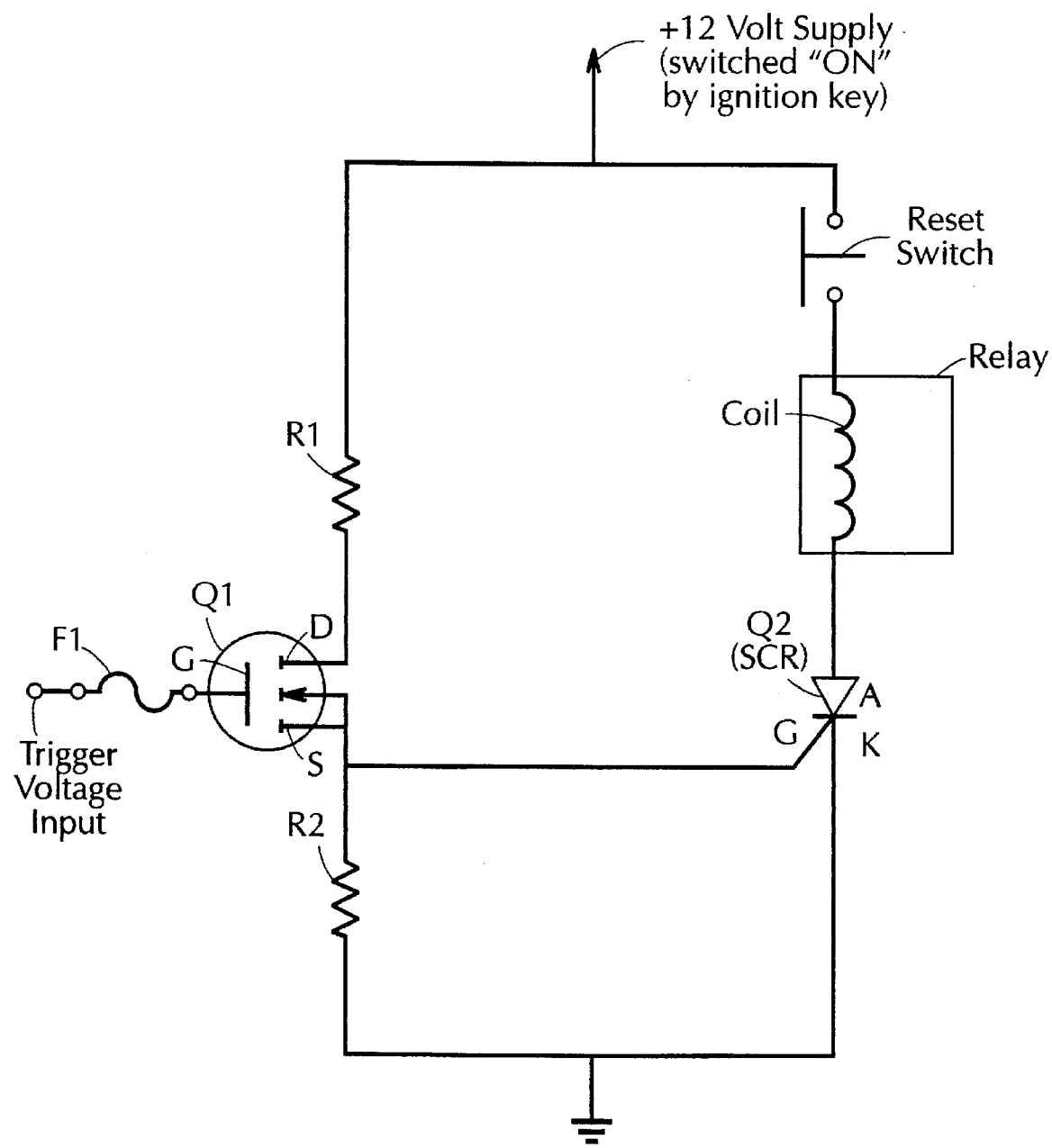
FIG. 2 is a schematic diagram of FIG. 1.

Operation with SCR Driver (refer to FIGS. 1,2)

When the windshield wiper circuit is turned on, a voltage, equal or greater than the gate threshold voltage passes through fuse F1 to the gate G of the electron valve Q1, and produces an electrostatic field, which permits the source S and drain D to conduct the flow of current. The resistor R1 protects the drain D of the electron valve Q1 from a sudden surge and the resistor R2 developes a voltage. The voltage that is developed across R2 will serve as a trigger voltage for the gate G of the rectifier Q2. The trigger voltage at the gate G of the recifier Q2 will permit the anode A and the cathode K to conduct the flow of current, which will flow through the relay coil and actuate the relay contacts. The relay contacts will close and connect the positive side of the battery through fuse F2 to the positive side of the lamp circuits. This connection transfers power directly from the battery to the connecting lamps. Current will flow through the lamps until a normally closed resist switch RS, which is in the relay coil circuit, is pushed and briefly opens the circuit, or the power supply has been interrupted.

Respectively; fuse F1 functions as a short-circuit protector for the wiper circuit to allow the wiper circuit to continue normal operation, if the election valve Q1 should become defective. Fuse F1 can be replaced by components that are designed specifically for circuit protection: components which will open, break, or melt, etc., when current passing through them exceeds a specific valve, such as, a very thin wire; a fusible metal strip; or a coil; etc. Also, components that have current-sensitive characteristics, where excessive current can damage or destroy the component very quickly, such as, diodes: signal diode; light emitting diode; switching diode; etc., various kinds of resistors, etc., can be used to replace fuse F1.

The electron valve Q1 functions as a coupler and a voltage controlled switch to join the low-speed wiper circuit with the E-Static Control isolated circuit (i.e. the lamp circuit). The gate circuit becomes part of the low-speed wiper circuit and the drain and source circuits become part of the isolated circuitry in the E-Static Control. The two circuits are coupled, to interact while maintaining physical electrical isolation. The electron valve Q1 will not switch "on" until voltage is applied to the gate. The gate circuit has no electrical contact with the drain and source circuits, but voltage on the gate from the wiper circuit, produces an electrostatic field which produces static electricity, that controls the switching operation between the source and the drain. This electrostatic field permits the drain and source to conduct the flow of current. The primary function in the drain and source circuit is to produce voltage. Q2 acts as a surge protector for the drain of Q1, and R2 is functioning as the voltage developer, developing voltage for the gate of Q2. The electron valve Q1 can be replaced by components that operate in the enhancement-mode and have suitable voltage, current, and power ratings which meet or exceed the requirements of the E-Static Control circuitry. Enhancement-mode components are field effect transistors (controllable electron valves) with insulated-gates and will not operate until a voltage is applied to the gate. These components, preferably MOSFETs, have very high input resistance and draw no current from external circuits joined at the gate Moreover, the electron valve Q1 is an N-Type channel component that operates with positive gate voltages. Nevertheless, the E-Static Control can be built with P-Type channel components to operate with negative gate voltages.

The rectifier Q essentially functions as a relay driver. The gate voltage, which is developed across R2, acts a triggering voltage to produces a small current that switches "on" the current flow, between the anode A and cathode, K circulating current throughout the driver circuit. This current will continue to circulate, even if the gate voltage is removed. The reset switch, which is normally closed, serves as an accessible-controllable means, to interrupt the path at the anode A. Once the path at the anode A is interrupted, the rectifier Q2 turns "or" and will not conduct until its gate receives another triggering voltage. The rectifier Q2 is used as a means to attain a constant flow of current, through the relay coil, in the driver circuit. This constant flow of current in the driver circuit is required, for effective switching operation with the relay contacts. The driver circuit is part of the isolated circuitry in the E-Static Control. The key function of the isolated circuitry, in the E-Static Control, is to govern the action of the automatic switch that controls power to the connecting lamp(s). An unlimited number of sub-circuits can be added to the isolated circuitry to perform countless functions, but the isolated circuitry must always be capable of governing the switching action of the automatic switch.

The rectifier Q2 serves as a medium which can utilize the variable voltage that is developed across R2 and accomplish the necessary operation required to activate the automatic switch (relay). Such a medium can be as simple as a single solid state switch, e.g., thyristors: SCR, TRIAC, etc., or as complex as a variety of components combined to make up a sub-circuit, which will utilize the variable voltage, to produce a function that can control other types of controllable electron valves, e.g., transistors: Bipolar, FET, Darlington, etc., to the degree where they can accomplish the required operation to effectively activate the relay.

The use of a sub-circuit, utilizing the variable voltage, to control other types of controllable electron valves, can be better understood by reviewing the section titled "Operation with E-MOSFET DRIVER" discussed below The relay R functions as a remote-controlled power switch to join isolated circuits while permitting one circuit to control other circuits without making physical electrical connections. The relay contacts transfer power to the connecting lamps. The relay coil remotely controls the switching operation of the relay contacts. The switching operation is controlled by current flowing through the relay coil. Each time the rectifier Q2 is activated, current flows through the relay coil and produces an electromagnetic field, which automatically actuates the movable contacts. The movable contacts join with the stationary contacts and complete a direct path, from the positive side of the battery through fuse F2 to the positive of the connecting lamps. The contacts remain joined until the current flowing through the relay coil is interrupted. Thus, even though the windshield wiper circuit may be independently turned off, the connected lamps remain on. The relay R is the preferred automatic switch, but other automatic switches and other sorts of automatic switching can be used to replaced the relay. For example, MOSFETs can operate like automatic switches; or a solenoid and a mechanical switch can be used together, to effectively operate like an automatic switch; optoisolators operate like automatic switches, etc. Whatever is used, it is very important to make sure the actuator, of the switch, can be electronically controlled and is not physically electrically connected to the switching element. Nevertheless, innumerable types of relays can be used, when building the E-Static control, i.e., magnetic, solid state, reed, etc., as well as, single pole, multipole, etc. Also, combinations of two or more relays can be used when building the E-Static Control.

The reset switch provides a convenient-controllable means, for interrupting the path of the current flow, at the anode A of the rectifier Q2 (SCR), and switching off the connecting lamps. The interruptions occur when the reset switch (normally closed pushed-button switch) is pushed momentarily and briefly breaks open the driver circuit. This brief opening, on the anode side of the rectifier Q2 ceases the flow of current and invariably turns off the rectifier Q2. In essence, the reset switch briefly opens the driver circuit, to stop the flow of current between the anode and the cathode of the rectifier Q2. With Q2 inactive, the relay becomes deactivated and switches "OFF" the connecting lamps. Thus, making the reset switch a convenient-controllable means for switching off the connecting lamps. The means for switching "OFF" the connecting lamps, should be controllable, to ensure the E-Static Control as safety device. An automatic means for switching "Off" the lamps, can be controlled, and is illustrated in my second preferred embodiment: "OPERATION WITH E-MOSFET DRIVER".

DESCRIPTION WITH E-MOSFET DRIVER

Figure 3:
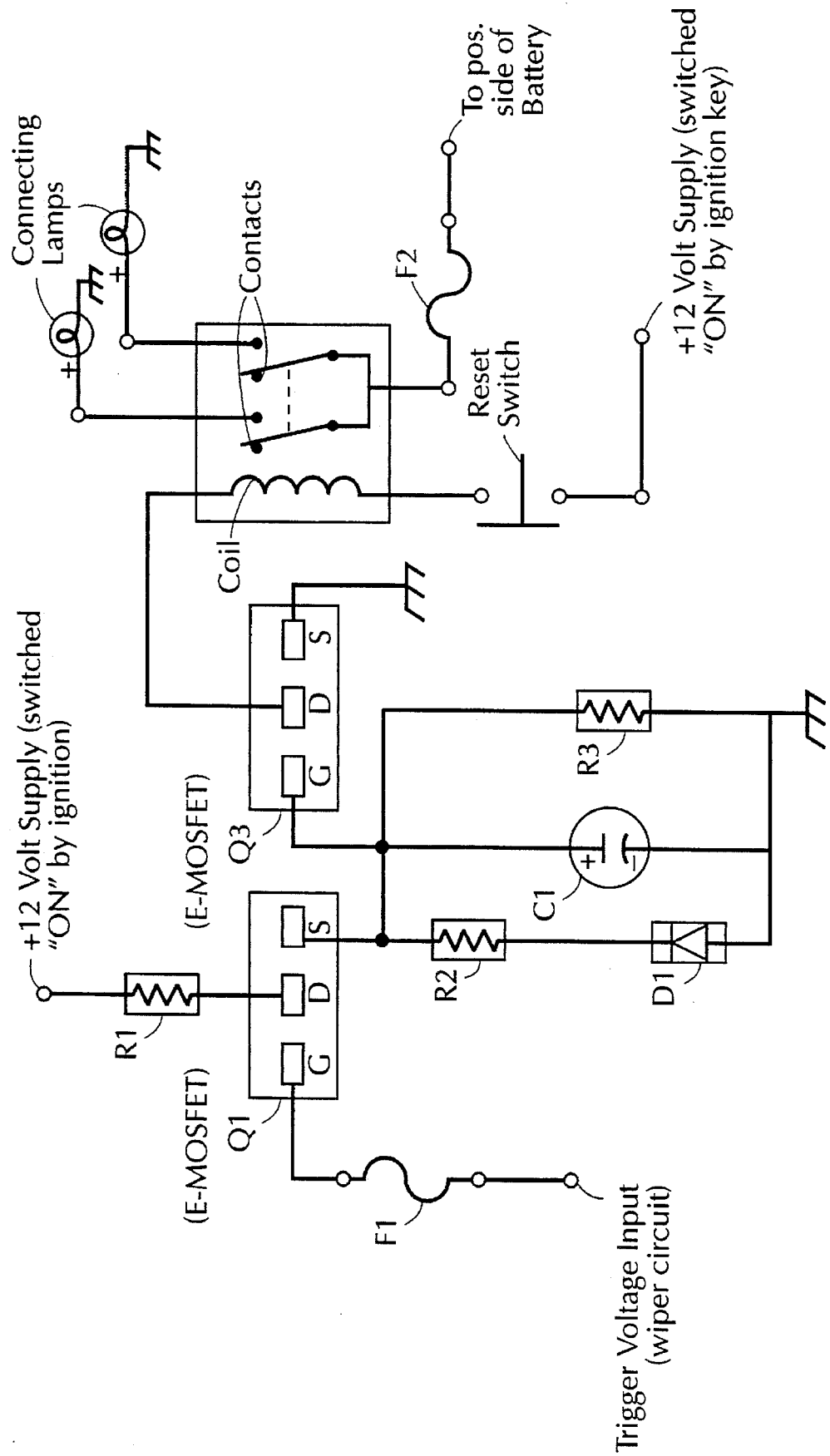
FIG. 3 is a component placement diagram with a Transistor (E-MOSFET) used as a relay driver.

FIG. 3, wherein like reference characters indicate like parts as above, shows the static physical structure of the E-Static Control circuit mounted on a universal printed circuit board (U-PCB), comprising a controllable electron valve (E-MOSFET) and an automatic switch (relay) with an E-MOSFET as a relay driver.

Fuse F1 is connected between the gate G of a first electron valve Q1 and the low-speed circuit, of the windshield wiper circuitry. The drain of Q1 is connected to a positive 12 volt supply through a resistor R1. One lead of R2 is connected to the source of Q1 and the other lead of R2 is connected to the cathode of D1. The anode of D1 is connected to the negative lead of a capacitor C1. The negative lead of the capacitor C1 is connected to one lead of a third resistor R3 and then connected to ground. The other lead of the resistor R3 is connected to the positive lead of the capacitor C1. The positive lead of the capacitor C1 is connected to the Source of the electron valve Q1 and to the Gate of a second electron valve Q3. The drain D of the second electron valve Q3 connects through the relay coil, to the same positive 12 volt power supply, that the drain D of the first electron valve Q1 is connected to. Both positive 12 volt supply points are connected together and both grounds are connected together, on the U-PCB, before making appropriate connections.

Figure 4:
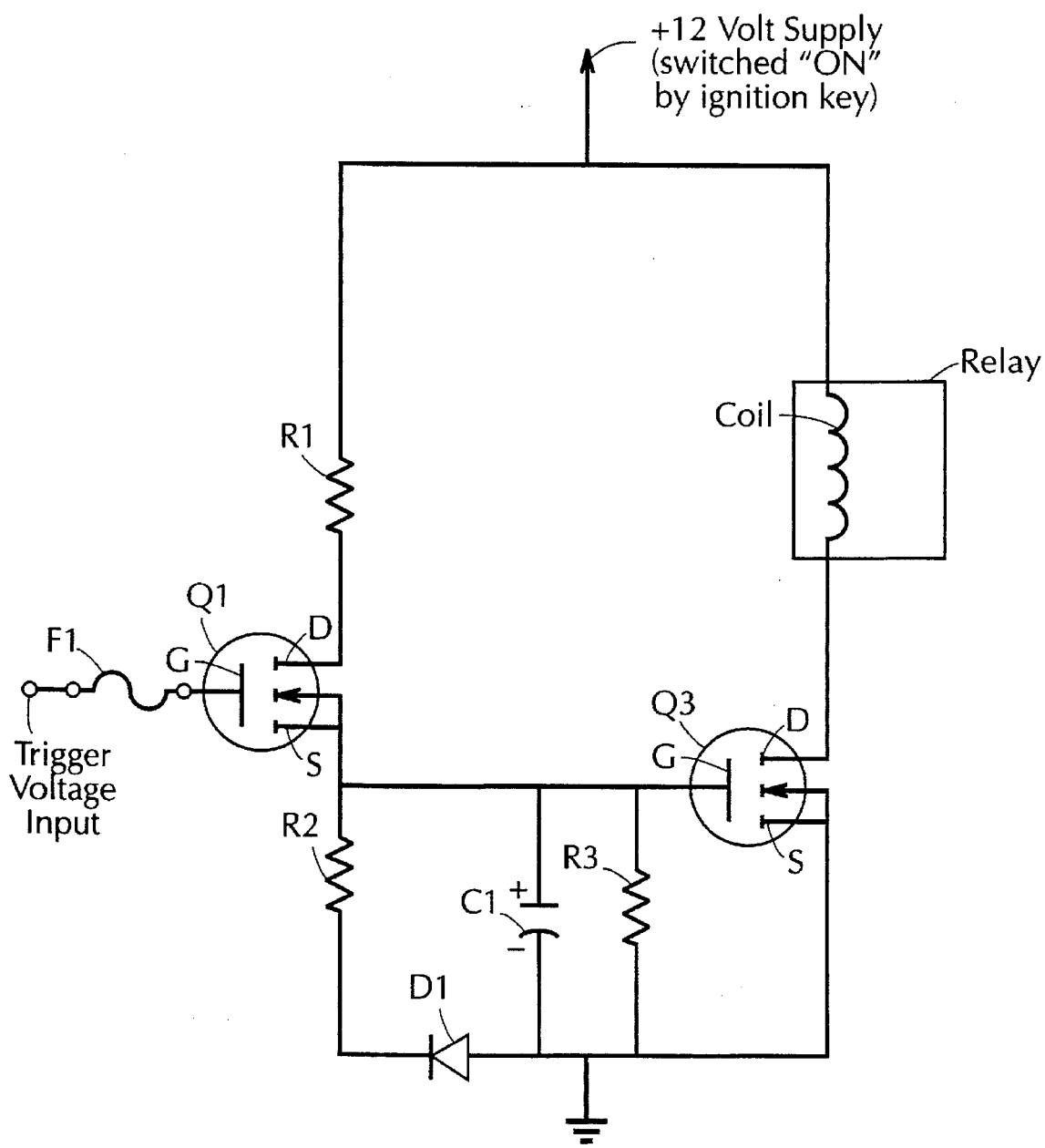
FIG. 4 is a schematic diagram of FIG. 3.

OPERATION WITH E-MOSFET DRIVER (to FIGS. 3,4)

Referring to FIGS. 3 and 4, the function and operation of the fuse F1, electron valve Q1 and resistor R1, R2, and the relay are the same as described in the "OPERATION WITH SCR DRIVER", which is in the first preferred embodiment. However, due to the nature of the wiper circuit; voltage variations will occur at the gate of Q1. These variations at the gate G, will in fact, cause the voltage which is developed across R2 to vary also. A sub-circuit network is added to maintain a constant threshold voltage at the gate G of the second electron valve Q3, which functions as the relay driver.

Specifically, a voltage is developed across the resistor R2 which will become the trigger voltage for the gate G of the second electron valve Q3 and a power source to charge the capacitor C1. The function of the capacitor C1 is to store an electrical charge, which will prevent variations in the voltage and delay a significant voltage drop on the gate G of the second electron valve Q3. The function of the diode D1 is to prevent the capacitor C1 from discharging through R2. The resistor R3 is added to allow the capacitor C1 to discharge through it and shorten the discharging time. The resistor R3 can be omitted and the discharging time can be increased or decreased by changing the valve of the capacitor C1. C1 is the controlling factor for switching "Off" the connecting lamps.

EXTERNAL CONNECTIONS (refer to FIG. 1, 3)

The external connections are predetermined then executed.

1. Trigger voltage input connection:

The trigger voltage input connection is wired and tapped directly into the low-speed circuit wire, of the windshield wiper system.

The low-speed circuit wire must first be identified before making connections:

a. Make sure the wiper control switch is in the "OFF" position.
 b. Disconnect the wiper connector plug from the wiper motor.
 c. Turn the ignition switch "ON" to accessory.
 d. Using a digital meter, check for voltage readings on each terminal inside the connector plug.
 e. Make note of each terminal and its attached wire that reads zero volts (less than one volt).

NOTE: One of the wires attached to one of the terminals with zero volts, is the low-speed circuit wire.

Turn the wiper control switch "ON" to low.

g. Again, take voltage readings on the terminals that read zero volts.

NOTE: The terminal that reads a voltage when the wiper control switch is "ON" low, is attached to the wire, which is the low-speed circuit wire in the windshield wiper system.

h. Tap the trigger-voltage input wire into the wire which has been identified as the low-speed circuit wire.

2. Positive 12 Volt Input Connection:

The positive 12 volt supply inputs are connected together, with a jumper wire, then wired to a positive 12 volt source, switched by the ignition key.

NOTE: Wiper motors have built-in limit switches that allow the wiper arms to stop at the bottom of the windshield, each time the wipers are turned "OFF". The limit switch has voltage to it whenever the ignition is on. Nevertheless, any positive 12 volt source, switched by the ignition key, will work.

3. GROUND CONNECTION:

The grounds on the universal printed circuit board are connected together, then wired to a common ground on the automobile.

4. RELAY CONNECTION:

Finally, for the relay connections, the movable-contact lead, of the relay, is connected with an in-line fuse to the positive side of the battery. The stationary-contact lead, of the relay, is connected to the positive side of the lamp(s).

NOTE: An in-line fuse to the positive side of the lamp(s) is optional.

SUMMARY, RAMIFICATIONS, AND SCOPE

Thus, the reader will see that the electrostatic operation of the invention provides a highly reliable electrostatic coupler, a very simple yet economical, adaptable, and efficient device which can be used with many variant windshield wiper circuits. Also, the invention provides an advantageous non-conducting insulated electrostatic connector which can be used in the most highly sensitive wiper circuits. And a device where only the mere presence of a voltage, from the wiper circuit, is needed for operation. The E-Static Control is truely a practical and convenient approach to aiding the proper use of automobile lights. The purpose, as described above is to function as a safety device, by allowing the windshield wiper circuit to automatically switch on lamp circuits each time the wipers are turned "ON". Furthermore, the E-Static Control has the additional advantages in that:

it will draw absolutely no current from the windshield wiper circuit for operation.
 it can be used in highly sensitive measuring applications where it is important to avoid loading down windshield wiper circuits.
 it will not permit physical electrical contact or allow current to pass when connected directly into windshield wiper circuitry.
 it is a very simple, inexpensive wiper and headlight control circuit which does not contain latching, multiple, or complex circuitry.
 it will couple directly into windshield wiper circuits to isolate, insulate, and operate switching actuation for headlights by using static electricity.
 it will enhance visibility for drivers and pedestrians in bad weather.
 it will increase the proper use of automobile lights, which is vital to safe driving, each time the windshield wipers are used.
 it will offer convenience by allowing independent isolated circuits to operate simultaneously from one operation.
 it will help provide safer driving conditions by permitting the driver to focus more on the road, instead of looking away locating various controls.

Although the description above contains many specificities, these should not be construed as limiting the scope of the invention but as merely providing illustrations of some of the presently preferred embodiments of this invention.

For example, the E-Static Control can be used to join other isolated electrical circuits for simultaneous operation; the circuitry can be manufactured on semiconductor material into an integrated circuit (IC) chip; the device can be divided into separate parts, e.g., the relay does not have to be mounted on the PCB with the affiliated parts, etc.

I claim:

1. An electrostatic control circuit for activating an automobile lighting system in response to activation of a windshield wiper system, said control circuit comprising an insulated-gate field effect transistor having a gate for connection to a windshield wiper circuit, a drain for connection to a power supply and a source for connection to ground, said gate having no physical contact with said drain and said source;

a rectifier having a gate connected to said source of said electron valve and to said ground, a cathode for connection to ground and an anode; and a relay having a coil connected to and between said anode of said rectifier and the power supply, at least one stationary contact for connection to a lighting circuit and at least one normally open movable contact for connection to the power supply whereby upon activation of the windshield wiper circuit and a flow of current from the power supply through said coil of said relay, said movable contact closes on said stationary contact to effect a flow of current to the lighting circuit from the power supply.

2. A control circuit as set forth in claim 1 wherein said electron valve is an enhancement mode metal-oxide-semiconductor field effect transistor.

3. A control circuit as set forth in claim 2 wherein said rectifier is a thyristor.

4. A control circuit as set forth in claim 1 which further comprises a normally closed reset switch connected to and between said coil of said relay and the power supply for selectively interrupting a flow of current to the lighting circuit.

5. A control circuit as set forth in claim 1 which further comprises a first resistor connected to and between said drain of said electron valve and the power supply and a second resistor connected to and between said supply of said electron valve and ground.

6. A control circuit as set forth in claim 1 which further comprises a fuse connected to and between said gate of said electron valve and the windshield wiper circuit.

7. An electrostatic control circuit for activating an automobile lighting system in response to activation of a windshield wiper system, said control circuit comprising a first insulated-gate field effect transistor having a gate for connection to a windshield wiper circuit, a drain for connection to a power supply and a source, said gate having no physical contact with said drain and said source;

a second insulated-gate field effect transistor having a gate, a drain for connecting to the power supply, and a source for connection to ground;

a relay having a coil connected to and between said drain of said second transistor and the power supply, at least one stationary contact for connection to a lighting circuit and at least one normally open movable contact for connection to the power supply; and a sub-circuit network for maintaining a constant threshold voltage at said gate of said second transistor, said network connected to said supply of said first transistor, said gate of said second transistor and ground.

8. A control circuit as set forth in claim 7 wherein said network includes a diode having a cathode and an anode; first resistor connected to and between said supply of said first transistor and said cathode of said diode; a capacitor having a negative lead connected to said anode of said diode and a positive lead connected to said gate of said second transistor; and a second resistor connected at one end to said supply of said first transistor and said positive lead of said capacitor, and at an opposite end to said anode of said diode, said negative lead of said capacitor and ground.

9. A control circuit as set forth in claim 8 wherein each transistor is an enhancement mode metal-oxide-semiconductor field effect transistor.

10. A control circuit as set forth in claim 8 which further comprises a normally closed reset switch connected to and between said coil of said relay and the power supply for selectively interrupting a flow of current to the lighting circuit.

11. A control circuit as set forth in claim 8 which further comprises a third resistor connected to and between said drain of said first transistor and the power supply.

12. A control circuit as set forth in claim 8 which further comprises a fuse connected to and between said gate of said first transistor and the windshield wiper circuit.

13. In combination, a first electrical circuit;

a second electrical circuit isolated from said first electrical circuit;

a power supply common to each said electrical circuit; and an electrostatic control circuit for activating said first electrical circuit in response to connection of said second electrical circuit to said power supply, said control circuit including a relay having at least one stationary contact connected to said first electrical circuit, at least one normally open movable contact connected to said power supply and a coil connected to said power supply for moving said movable contact onto said stationary contact in response to a flow of current through said coil; an insulated gate field effect transistor having a gate connected to said second electrical circuit, a drain connected to said power supply, and a source, said gate having no physical contact with said drain and said source; and a relay driver connected to and between said source of said transistor and said coil of said relay to energize said coil in response to activating of said second electrical circuit.

14. The combination as set forth in claim 13 wherein said relay driver is a rectifier having a gate connected to said source of said electron valve, an anode connected to said coil and a cathode connected to ground.

15. The combination as set forth in claim 13 wherein said relay driver is a second transistor having a gate connected to said source of the first transistor, a drain connected to said coil and a source connected to ground.

16. The combination as set forth in claim 15 which further comprises a sub-circuit network for maintaining a constant threshold voltage at said gate of said second transistor, said network being connected to said source of said first transistor, said gate of said second transistor and ground.

17. The combination as set forth in claim 16 wherein said network includes a diode having a cathode and an anode;

and first resistor connected to and between said source of said first transistor and said cathode of said diode; a capacitor having a negative lead connected to said anode of said diode and a positive lead connected to said gate of said second transistor and a second resistor connected at one end to said source of said first transistor and said positive lead of said capacitor, and at an opposite end to said anode of said diode, said negative lead of said capacitor and ground.

18. The combination as set forth in claim 13 wherein said first electrical circuit is a lighting circuit and said second electrical circuit is a windshield wiper circuit in an automobile.

19. The combination as set forth in claim 13 where said transistor is an enhancement mode metal-oxide-semiconductor field effect transistor.

20. A control circuit for activating an automobile lighting system in response to activation of a windshield wiper system, said control circuit comprising an electron valve having a gate for connection to a windshield wiper circuit, a drain for connection to a power supply and a source for connection to ground;

a rectifier having a gate connected to said source of said electron valve and to said ground, a cathode for connection to ground and an anode;

a relay having a coil connected to and between said anode of said rectifier and the power supply, at least one stationary contact for connection to a lighting circuit and at least one normally open movable contact for connection to the power supply whereby upon activation of the windshield wiper circuit and a flow of current from the power supply through said coil of said relay, said movable contact closes on said stationary contact to effect a flow of current to the lighting circuit from the power supply; and a normally closed reset switch connected to and between said coil of said relay and the power supply for selectively interrupting a flow of current to the lighting circuit.

* * * * *

UNITED STATES PATENT AND TRADEMARK OFFICE
CERTIFICATE OF CORRECTION

PATENT NO. : 5,666,005
DATED : September 9, 1997
INVENTOR(S) : STEPHEN LIONEL WATFORD It is certified that error appears in the above-identified patent and that said Letters Patent is hereby corrected as shown below:

Column 4, line 2 cancel ","
    Line 6 change "Q1 valve" to -valve Q1-
    Lines 8 and 10 change "sources" to -source S-
    Line 22 change "e" to -a-

Column 5, line 27 change "Q" to -Q2-
    Line 28 after "acts" insert -as-
    Line 29 change "produces" to -produce- Column 6, line 16 change "replaced" to -replace-
    Line 21 cancel "," (both occurrences)

Column 8, line 29 change ". And" to -and-

Column 9, lines 17, 30, 43, 45 and 48 change "electron valve- to -transistor-

Signed and Sealed this

Twenty-first Day of April, 1998

Attest:

BRUCE LEHMAN

Attesting Officer      Commissioner of Patents and Trademarks